United States Patent
MacDonald et al.

(10) Patent No.: US 11,402,741 B2
(45) Date of Patent: Aug. 2, 2022

(54) AUTOMATED DEBRIS REMOVAL

(71) Applicant: Halliburton Energy Services, Inc., Houston, TX (US)

(72) Inventors: Gillies Alexander MacDonald, Aberdeenshire (GB); Prashant Shekhar, Houston, TX (US); Abhijit Kulkarni, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 418 days.

(21) Appl. No.: 16/726,403

(22) Filed: Dec. 24, 2019

(65) Prior Publication Data
US 2021/0191252 A1   Jun. 24, 2021

(51) Int. Cl.
| G03B 37/00 | (2021.01) |
| E21B 47/01 | (2012.01) |
| E21B 21/08 | (2006.01) |
| E21B 47/002 | (2012.01) |
| H04N 5/217 | (2011.01) |
| B08B 3/02 | (2006.01) |
| B60S 1/08 | (2006.01) |

(52) U.S. Cl.
CPC .............. *G03B 37/005* (2013.01); *B08B 3/02* (2013.01); *E21B 21/08* (2013.01); *E21B 47/002* (2020.05); *E21B 47/0025* (2020.05); *E21B 47/01* (2013.01); *H04N 5/2171* (2013.01); *B60S 1/0848* (2013.01)

(58) Field of Classification Search
CPC . G03B 37/005; B60S 1/0848; E21B 47/0025; E21B 47/002; E21B 21/08; E21B 23/08; H04N 5/2171
See application file for complete search history.

(56) References Cited

U.S. PATENT DOCUMENTS

| 6,554,210 | B2 * | 4/2003 | Holt .......................... B60S 1/54 239/69 |
| 9,304,377 | B2 * | 4/2016 | Eineren ................ H04N 5/2252 |
| 9,313,379 | B2 * | 4/2016 | Manaois ................. B05B 7/267 |

(Continued)

FOREIGN PATENT DOCUMENTS

| CN | 207681072 U | * | 8/2018 | |
| DE | 102012218583 A1 | * | 4/2013 | ............... B60S 1/52 |

(Continued)

OTHER PUBLICATIONS

PCT Application No. PCT/US2019/068501, International Search Report dated Sep. 21, 2020, 3 pages.

(Continued)

*Primary Examiner* — John Villecco
(74) *Attorney, Agent, or Firm* — Delizio, Peacock, Lewin & Guerra

(57) ABSTRACT

A system for automated detection and removal of visual obstructions such as debris, fumes, or mist from the view zone of an imaging device. An autodetection algorithm runs on incoming visual data from a data acquisition (DAQ) system to determine if a visual obstruction is present. A controller initiates a dry-cleaning dual cycle (DCDC) run including a wet clean cycle and a dry clean cycle. During the wet clean cycle, a base fluid mist is distributed onto the view zone. Subsequently during the dry clean cycle, compressed air is distributed onto the view zone.

20 Claims, 6 Drawing Sheets

(56) References Cited

U.S. PATENT DOCUMENTS

| | | | |
|---|---|---|---|
| 9,505,382 B2 * | 11/2016 | Gokan | B60S 1/0848 |
| 9,581,011 B2 * | 2/2017 | Tjhang | E21B 10/60 |
| 9,746,666 B2 * | 8/2017 | Eineren | G02B 27/0006 |
| 10,095,026 B2 * | 10/2018 | Eineren | H04N 5/2252 |
| 10,286,877 B2 * | 5/2019 | Lopez Galera | B60S 1/54 |
| 10,414,383 B2 * | 9/2019 | Davies | B60S 1/54 |
| 10,807,568 B2 * | 10/2020 | Mizuno | B08B 3/02 |
| 11,034,337 B2 * | 6/2021 | Davies | B60S 1/46 |
| 2002/0005440 A1 * | 1/2002 | Holt | B05B 15/652 |
| | | | 239/284.2 |
| 2008/0285132 A1 | 11/2008 | O'Kane | |
| 2014/0007909 A1 * | 1/2014 | Manaois | H04N 5/23229 |
| | | | 134/18 |
| 2014/0151123 A1 * | 6/2014 | Spoelstra | E21B 7/062 |
| | | | 175/45 |
| 2015/0007983 A1 * | 1/2015 | Tjhang | E21B 47/002 |
| | | | 166/250.01 |
| 2015/0068806 A1 | 3/2015 | Duran Toro et al. | |
| 2015/0185592 A1 * | 7/2015 | Eineren | G03B 17/02 |
| | | | 348/375 |
| 2015/0203077 A1 * | 7/2015 | Gokan | H04N 5/2252 |
| | | | 134/102.2 |
| 2015/0343999 A1 * | 12/2015 | Lopez Galera | B60S 1/0848 |
| | | | 134/30 |
| 2016/0178898 A1 * | 6/2016 | Eineren | H04N 5/2252 |
| | | | 348/375 |
| 2017/0192226 A1 * | 7/2017 | Eineren | G02B 27/0006 |
| 2017/0313286 A1 * | 11/2017 | Galera | B08B 3/02 |
| 2019/0126891 A1 * | 5/2019 | Kondo | B60S 1/56 |
| 2019/0248340 A1 * | 8/2019 | Chen | B60S 1/56 |
| 2019/0345819 A1 | 11/2019 | Aird | |
| 2020/0001832 A1 * | 1/2020 | Deane | B60S 1/52 |
| 2020/0114880 A1 * | 4/2020 | Hahn | B60S 1/52 |
| 2021/0402961 A1 * | 12/2021 | Agrotis | B60S 1/54 |
| 2021/0402962 A1 * | 12/2021 | Li | B60S 1/483 |

FOREIGN PATENT DOCUMENTS

| | | | | |
|---|---|---|---|---|
| DE | 102014213282 A1 * | 1/2016 | | B60S 1/0848 |
| EP | 2949520 A1 * | 12/2015 | | B08B 3/02 |
| JP | 2018184023 A * | 11/2018 | | |
| KR | 100629922 B1 | 10/2006 | | |
| WO | 9704213 A1 | 2/1997 | | |
| WO | 2007102971 A2 | 9/2007 | | |
| WO | WO-2021170274 A1 * | 9/2021 | | |

OTHER PUBLICATIONS

PCT Application No. PCT/US2019/068501, Written Opinion dated Sep. 21, 2020, 5 pages.

* cited by examiner

AUTOMATED DEBRIS REMOVAL

BACKGROUND

The disclosure generally relates to the field of fluid current conveyors and subclass conveyors with means to control conveying fluid or movement of load in response to sensed condition.

Imaging devices deployed in drilling operations can encounter a buildup of debris/fumes/mist in the environment caused by drilling mud coming from downhole. The debris/fumes/mist can obstruct the view of the imaging device with respect to its' target.

BRIEF DESCRIPTION OF THE DRAWINGS

Embodiments of the disclosure may be better understood by referencing the accompanying drawings.

DETAILED DESCRIPTION

Figure 1:
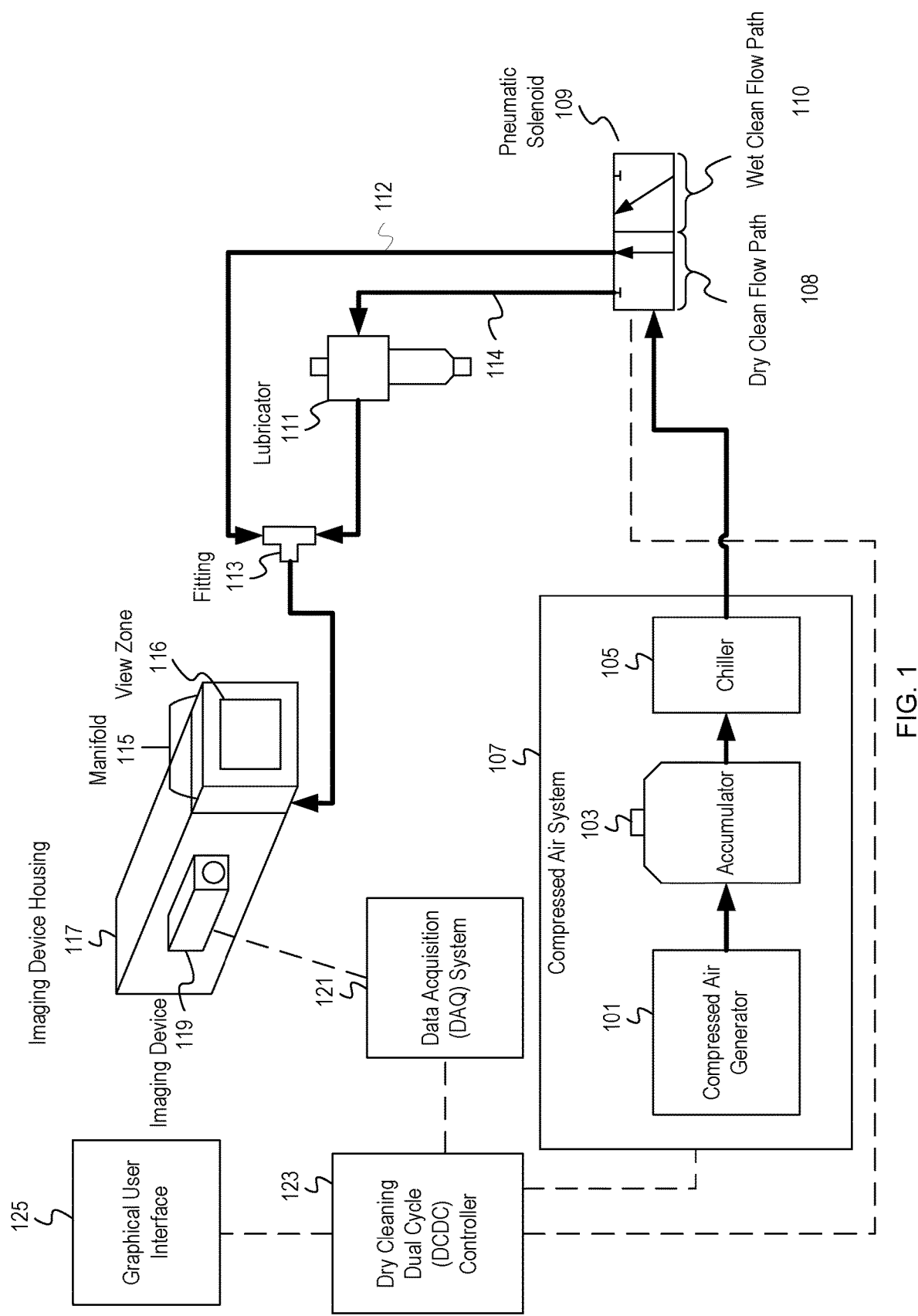
FIG. 1 is a schematic diagram of an example automated debris removal system.

The description that follows includes example systems, methods, techniques, and program flows that embody aspects of the disclosure. However, it is understood that this disclosure may be practiced without these specific details. For instance, this disclosure refers to clearing the view zone of an imaging system deployed in a drilling operation in illustrative examples. Aspects of this disclosure can be also applied to imaging systems deployed in other environments. In other instances, well-known instruction instances, protocols, structures and techniques have not been shown in detail in order not to obfuscate the description.

Hydrocarbon extraction operations use imaging devices to obtain measurement data. An imaging device can be deployed downhole or on the surface of the Earth and can measure the volume or shape of drill cuttings, proppants, and cements coming from downhole and can forward these measurements to a separate computing system for further analysis. The imaging device can monitor flow coming from return pipes from downhole or can be deployed for surveillance of a drilling rig. The imaging device is typically in an environment where a particulate visual obstruction, such as debris, mist, or fume droplets, which may be in the form of solids, fluids, or mixtures of solids and fluids, comes into contact with the view zone of the imaging system housing. Systems and methods are disclosed for dealing with the particulate visual obstruction so it does not remain in contact with the view zone, to ensure reliability of measurements made by the imaging system. Numerous examples below are discussed in the context of debris, but it should be recognized that these examples are equally applicable to other types of visual obstructions.

In one aspect, for example, a dry-cleaning dual cycle (DCDC) system is disclosed to remove a visual obstruction from the view zone of an imaging device in a deployment with a high likelihood of visual obstructions, such as a hydrocarbon extraction environment. This DCDC system removes visual obstructions and avoids leaving a drilling fluid residue. The DCDC system performs a cleaning run by first flushing the view zone with a mist of a drilling fluid base ("base fluid") and then blowing compressed air onto the flushed view zone at predetermined time intervals. Then, the DCDC system conveys compressed air through a pneumatic solenoid including a valve that switches between a fluid mist tube and a dry air tube at different stages of the cleaning run. The fluid mist or air can be further conveyed through a manifold having an arrangement of tubes directed at the view zone. A full DCDC cleaning run ensures proper cleaning of the view zone. The designed DCDC system can be certified for Zone 1 and Class 1, Division 1 hazardous location installations.

In addition to comprehensive visual obstruction removal, the DCDC system can be programmed or configured to trigger DCDC runs without interfering with or delaying data acquisition. A data acquisition (DAQ) system collects data from the imaging device and forwards it to a computing device (hereinafter a "DCDC controller") which can run an autodetection algorithm to determine whether debris is obstructing the view zone. When a visual obstruction is detected in the view zone, the DCDC controller instructs the DCDC system to execute a DCDC run on the view zone.

Example Illustrations

FIG. 1 is a schematic diagram of an example debris removal system 100 attached to an imaging device 119. The debris removal system includes a compressed air system 107, a pneumatic solenoid 109, and additional components to convey air and base fluid for debris removal from a view zone 116 of the imaging device 119. A controller for the debris removal system can be implemented differently. As examples, the debris removal system can include a DCDC controller 123 configurable to control the compressed air system 107 (e.g., a programmed schedule) or include the DCDC controller 123 programmed to control the compressed air system in accordance with data from a data acquisition (DAQ) system 121 or graphical user interface (GUI) 125.

The compressed air system 107 generates compressed air via a compressed air generator 101. In this illustration, the compressed air system 107 is communicatively coupled with the DCDC controller 123. For a cleaning cycle, the DCDC controller 123 sends a signal to the compressed air system 107 to send a predetermined amount of accumulated compressed gas in an accumulator 103 through the chiller 105. This amount can be a standard amount for the accumulator 103 or can be communicated via the signal sent from the DCDC controller 123. The DCDC controller 123 can have a different method of communication with the compressed air system 107. As an example, the compressed air system 107 can generate predetermined amounts of compressed air at predetermined time intervals, using compressed air generator 101, and can store the generated compressed air in the accumulator 103 for later use. The accumulator 103 can include multiple distinct accumulators which can store compressed air for varying amounts of time depending on the size and pressurization of each accumulator, in addition to the overall load of compressed air in the system. The chiller 105 can be chosen according to efficiency which typically ranges between 3.5 and 7 kilowatts per refrigerator ton for medium to large chillers. A refrigerant can be chosen based on the desired application cooling temperature as well as environmental factors. The application cooling temperature can be chosen within 20° of the ambient temperature when measured in Fahrenheit, or 11.1° when measured in Celsius, at the imaging device 119. Although illustrated as including the compressed air generator 101, the accumulator 103, and the chiller 105, the compressed air system 107 can be any type of compressor that generates compressed air.

The compressed air system 107 conveys the generated compressed air to a pneumatic solenoid 109. Although implementations can use any of various pneumatic solenoids, the pneumatic solenoid will be able define at least two flow paths: 1) valve actuated to convey air to a first conduit and 2) valve actuated to convey air to a second conduit. Implementations can use a pneumatic solenoid with an additional flow path to not convey air to either conduit. The state in which the pneumatic solenoid 109 conveys air to a conduit to a component that injects base fluid into the compressed air is referred to herein as a wet clean flow path and depicted in FIG. 1 as a wet clean flow path 110. The state in which the pneumatic solenoid 109 conveys compressed air to a channel that does not inject base fluid into the compressed air is referred to herein as the dry clean flow path and depicted in FIG. 1 as a dry clean flow path 108. When the pneumatic solenoid 109 is set to the dry clean flow path 108, the pneumatic solenoid 109 conveys the compressed air through pipe 112 to a fitting 113. When the pneumatic solenoid 109 is set to the wet clean flow path 110, the pneumatic solenoid 109 conveys the compressed air through pipe 114 and a lubricator 111 to a fitting 113. The pneumatic solenoid 109 is communicatively coupled to the DCDC controller 123. The DCDC controller 123 and can send a signal to the pneumatic solenoid 109 to actuate a valve and change the state of the pneumatic solenoid 109.

The lubricator 111 receives compressed air from the pneumatic solenoid 109 via the pipe 114 and injects base fluid into the compressed air to generate a base fluid mist. The choice of base fluid can depend on the type of debris obstructing the view zone 116. For example, if the debris is drilling mud, then the base fluid injected by lubricator 111 can be the same as the base fluid of the drilling mud, such as crude oil, water, diesel, etc. To reduce the frequency of external maintenance, the lubricator 111 can contain a large amount of base fluid or can use a remote auto fill solution. A remote auto fill solution can deploy a high pressure pump, a reservoir, and a remote fill device kit, for example Parker® PS505CP or other products made by different manufacturers.

A manifold 115 receives compressed air or base fluid mist via the fitting 113. The manifold 115 is communicatively coupled to the DCDC controller 123 and can receive signals that determine a configuration of the manifold 115. The configuration of the manifold 115 corresponds to open and closed positions of its' internal valves (not depicted) to regulate the direction and pressure of the compressed air or base fluid mist. This configuration can depend on whether compressed air or base fluid mist is being conveyed to the manifold 115, the pressurization of the compressed air or base fluid mist, the elapsed time since the compressed air or base fluid mist was first conveyed, the overall load on the debris removal system 100, the specifications of the debris removal system 100, etc. The compressed air or base fluid mist flows through tubes connected to the manifold 115 and onto the view zone 116 to clean debris.

An imaging device housing 117, which can be attached to the manifold 115 and the view zone 116, shields the imaging device 119 from ambient debris. The imaging device 119 is communicatively coupled with the DAQ system 121 which is communicatively coupled with the DCDC controller 123. The DAQ system receives image data from imaging device 119, formats the received visual data, and forwards the formatted image data to the DCDC controller 123. The imaging device housing 117 can be certified for Zone 1 and Class 1, Division 1 hazardous location installations. The imaging device housing 117 can accordingly be an explosion-proof box to maintain this classification. The cables that interface the imaging device 119 with the DAQ system 121 can be armored or unarmored intrinsically safe cables.

The DCDC controller 123 receives the formatted image data and can store it in memory for future analysis. Alternatively, the DCDC controller 123 can be communicatively coupled to another computer (not depicted) and can forward the formatted image data to the computer. As the DCDC controller 123 receives incoming formatted image data from DAQ system 121, it continuously runs an autodetection algorithm on the formatted image data to determine whether debris removal is required. The autodetection algorithm can vary in complexity. For example, the autodetection algorithm can determine debris removal is required at set time intervals. In other embodiments, the autodetection algorithm can track specific zones of the formatted image data over time to determine whether the formatted image displays a pre-calibrated length corresponding to that zone in the image. More sophisticated debris autodetection algorithms, for example object detection using machine learning, can also be implemented.

Once the DCDC controller 123 makes a determination that debris removal from the view zone 116 is required, the DCDC controller 123 generates a sequence of signals corresponding to the DCDC run that it sends to the compressed air system 107, the pneumatic solenoid 109, and the manifold 115 at set time intervals. The DCDC controller 123 can additionally generate a cleaning trigger along with corresponding metadata that it sends to the GUI 125. The GUI 125 can create a visual display indicating that a DCDC run was triggered in addition to metadata corresponding to the occurrence of the trigger. This metadata can include a time and location of the trigger, a severity metric for the trigger, the current stage of the DCDC run, etc.

Figure 2:
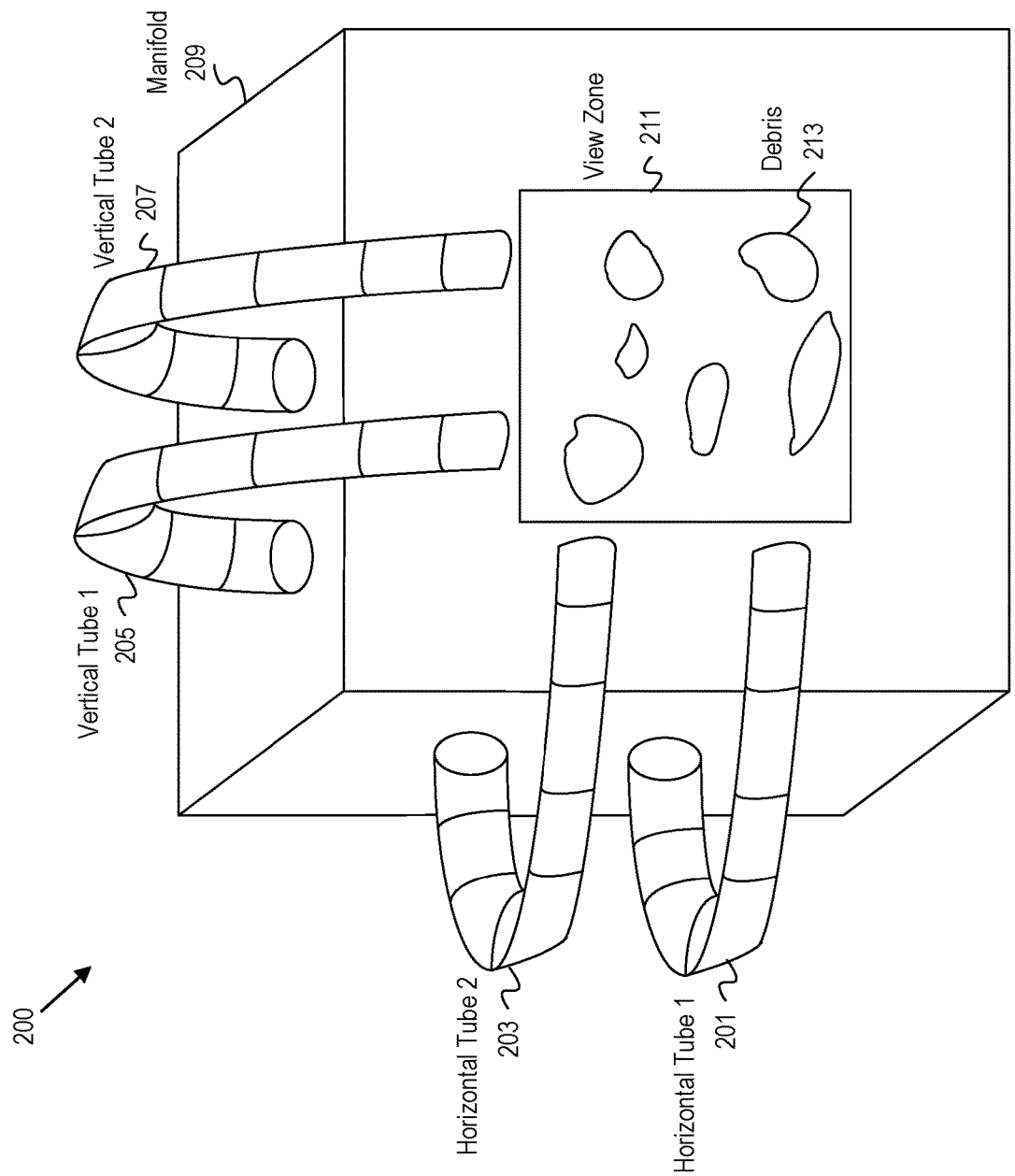
FIG. 2 is a zoomed in frontal view of a manifold component of an automated debris removal system.

FIG. 2 is a zoomed in frontal view of a manifold component 200 of an automated debris removal system. In various embodiments, the manifold component 200 as illustrated in FIG. 2 depicts a zoomed in frontal view of the manifold 115 and view zone 116 from FIG. 1. Referring back to FIG. 2, a manifold 209 of manifold component 200 can include an arrangement of tubes: horizontal tube 1 201, horizontal tube 2 203, vertical tube 1 205, and vertical tube 2 207. Although the tubes in FIG. 2 are depicted as being either vertically or horizontally arranged, the tubes can take any arrangement that directs base fluid mist or air at a view zone 211. Moreover, although the view zone 211 is depicted as a square and the manifold 209 as a box, these components can also take any form that allows the view zone 211 to be embedded in the manifold 209. For example, the view zone 211 can be circular, the manifold 209 can be cylindrical, and the tubes 201, 203, 205, and 207 can be arranged in a circular manner. The manifold 209 can have multiple configurations corresponding to different amounts of air/mist flow through the tubes 201, 203, 205, 207. This configuration can be enabled by a system of valves (not depicted) controlling air flow to each tube. In drilling applications, debris 213 contains a drilling fluid that can be one of water, diesel, crude oil, etc. The debris 213 can be in the form of a mud, fumes, mist, etc. depending on the type of drilling fluid as well as the operating conditions.

The shape of the view zone 211 and the manifold 209 should be considered when arranging the tubes 201, 203, 205, 207. In FIG. 2, the tubes 201, 203, 205, 207 are arranged with a vertical or horizontal orientation and the openings of the tubes are flush with the view zone 211 for proper cleaning during a DCDC run. Although not depicted, additional tubes on to the right side and below the view zone 211 can be deployed for greater coverage. If an example view zone is circular, a circular arrangement of tubes can be equally spaced from each other and flush with the circular view zone. The tubes 201, 203, 205, and 207 can be lube-cools or rigid metal tubes. These tubes may be certified for Zone 1 and Class 1, Division 1 hazardous location installations. Accordingly, the tubes 201, 203, 205, and 207 can be armored tubes or unarmored intrinsically safe tubes.

Example Operations

Figure 3:
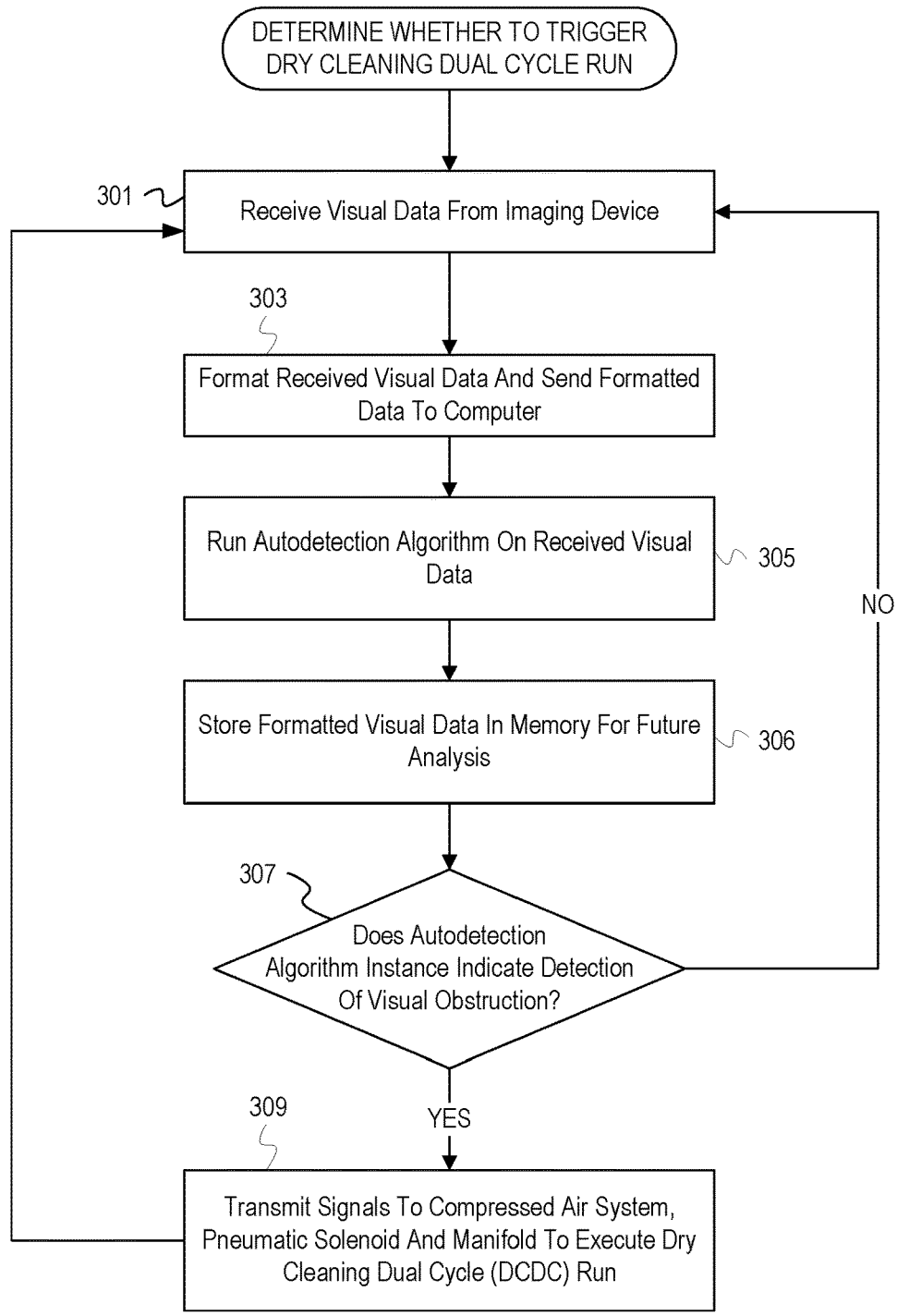
FIG. 3 is a flowchart of operations for receiving and analyzing visual data for the purposes of automated debris removal.

FIG. 3 is a flowchart of example operations to determine whether to trigger a DCDC run. For consistency with FIG. 1, the example operations are described with reference to a controller, a DAQ system, and an imaging device. At block 301, a DAQ system receives visual data from an imaging device. The visual data can be raw image data or image data with additional metadata such as a time stamp, an imaging device identifier, etc.

At block 303, the DAQ system formats the visual data and sends the formatted data to a controller. The DAQ system can add metadata to the received raw image data, such as time stamps, view zone identifiers, and other deployment information to be provided to a user and/or during further analysis. The DAQ system can additionally transform the raw image data into a format that can be more easily analyzed by an autodetection algorithm running on the controller. For example, the DAQ system can transform raw image data using a filter to isolate noise caused by debris. In other examples, the formatted data can include raw image data files and otherwise transformed data for separate analysis, examples of which are described below.

At block 305, the controller executes an autodetection algorithm on the received data which determines whether a visual obstruction is in the view zone and possibly to output a cleaning trigger. The controller can concurrently run other types of analysis on the formatted visual data to guide drilling operations. For example, the controller can simultaneously monitor components of the drilling system for operational anomalies. The controller may further store the formatted data in memory for future analysis or forward the formatted data to a separate computer for analysis.

At block 307, the controller determines whether the executing instance of the autodetection algorithm returns an indication that a visual obstruction has been detected. The executing instance of the autodetection algorithm can set a flag or return a value that indicates whether a visual obstruction was detected based on the visual data passed or input to the executing instance of the autodetection algorithm. In some cases, an autodetection algorithm can be coded to output or return additional information, such as location information of the visual obstruction(s). Since the visual data collection and analysis, the executing instance of the autodetection algorithm may also return/output a timestamp propagated from the input visual data. Thus, the controller operates based on time series data instead of a single point-in-time decision. The controller can evaluate a time window of outputs from the autodetection algorithm instance before triggering a run, as an example. If the autodetection algorithm instance does not return an indication of a visual obstruction, then operation returns to block 301. Otherwise, operation continues to block 309.

At block 309, the controller sends a sequence of timed signals to a compressed air system, a pneumatic solenoid 109, and a manifold 115 to execute a DCDC run. One possible such sequence of timed signals is outlined in FIG. 4. The timing of the signals can depend on operating conditions, specifications of the various deployed systems, current compressed air/base fluid supply, pressure levels, etc. The controller can additionally send the cleaning trigger and deployment information for the DAQ system to a graphical user interface. Concurrently with the operations in block 309, control proceeds back to block 301. Although the operations 303, 305, and 306 are depicted as occurring in sequence after block 301, block 301 can run concurrently with all operations in FIG. 3. Accordingly, the DAQ system can continuously receive visual data during all other operations.

Figure 4:
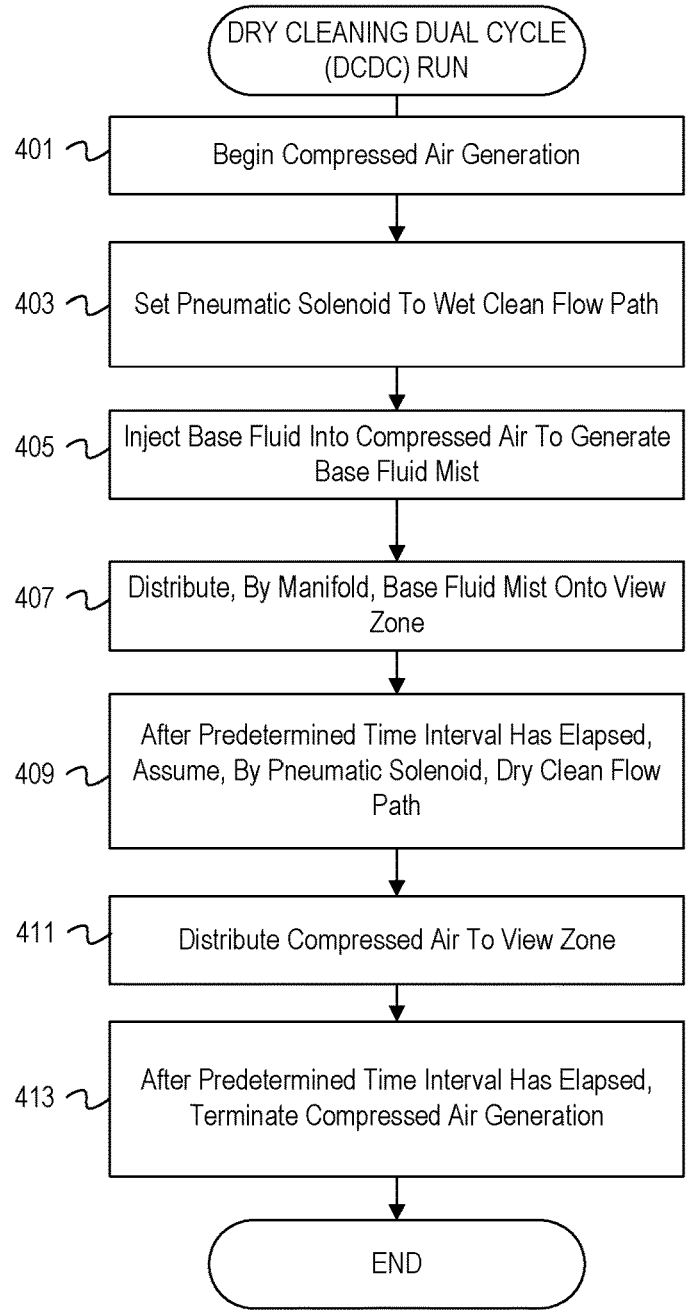
FIG. 4 is a flowchart of operations for debris removal in response to an automated cleaning trigger.

FIG. 4 is a flowchart of example operations for a dry cleaning dual cycle (DCDC) run. For consistency with the preceding Figures, the example operations of the flowchart are described with reference to a controller. FIG. 4 depicts a controller sending a sequence of signals to various components during the DCDC run. The order and timing of this sequence of signals can be predetermined by a program running on the controller or can be specified by a set of parameters provided by a user. The sequence of signals described herein is an exemplary embodiment, but other sequences can be chosen. The operations in FIG. 4 are grouped into two distinct cycles, a wet clean cycle and a dry clean cycle. The wet clean cycle corresponds to blocks 401, 403, 405, and 407. The dry clean cycle corresponds to blocks 409, 411, and 413.

At block 401, the controller sends a signal to a compressed air system to begin compressed air generation. The compressed air can be generated as described in FIG. 1. If there is a surplus of compressed air in the system, compressed air can be released from an accumulator and no additional compressed air is generated during the DCDC run.

Concurrently or shortly thereafter at block 403, the controller sends a signal to a pneumatic solenoid to define a wet clean flow path. When in the wet clean flow path, the pneumatic solenoid directs air generated by the compressed air system to a lubricator. The pneumatic solenoid remains in the wet clean flow path state until block 409. In some embodiments, the pneumatic solenoid has already been in the wet clean flow path state since the end a previous DCDC run.

At block 405, as the compressed air arrives at the lubricator, the lubricator injects base fluid into the compressed air to generate base fluid mist. In some embodiments, the lubricator contains or is coupled with reservoirs of different base fluids. The controller can signal to the lubricator which of the base fluids should be selected by the lubricator for creation of the base fluid mist. Once the lubricator injects base fluid into the compressed air, the base fluid mist flows through the fitting to the manifold.

At block 407 the controller sends a signal to a manifold proximate to a view zone of an imaging device to actuate an internal valve configuration for base fluid mist distribution on the view zone. This internal valve configuration determines the direction and pressure of the base fluid mist as it is distributed onto the view zone. The configuration can be communicated via the signal from the controller or the signal can indicate a predetermined configuration stored on the manifold.

At block 409, after a predetermined time interval from the start of block 401 has elapsed corresponding to the length of the wet clean cycle, the pneumatic solenoid receives a signal from the controller to define the compressed air valve flow path. This redirects the compressed air through the fitting, and directly to the manifold.

At block 411, concurrently or before the pneumatic solenoid assumes the compressed air valve flow path, the manifold receives a signal from the controller to actuate an internal valve configuration corresponding to compressed air distribution on the view zone. This internal valve configuration can be the same or distinct from the internal valve configuration for base fluid mist distribution. In other embodiments, the controller can send a signal to the compressed air system to temporarily stop generating compressed air while the pneumatic solenoid switches flow path and the manifold switches configurations.

At block 413, once a predetermined time interval has elapsed corresponding to the length of the dry clean cycle, the compressed air system receives a signal from the controller to stop compressed air generation. The controller can send a signal to the pneumatic solenoid to define the wet clean flow path state in anticipation of a next DCDC run.

The flowcharts in FIGS. 3 and 4 each illustrate one example to aid in understanding this disclosure and should not be used to limit the claims. Subject matter falling within the scope of the claims can vary with respect to the order and some of the operations. For example, the operations 301, 303, 305, and 306 can occur concurrently with operation 309. Operations 305 and 306 can also occur concurrently with operation 301.

Example Drilling Application

Figure 5:
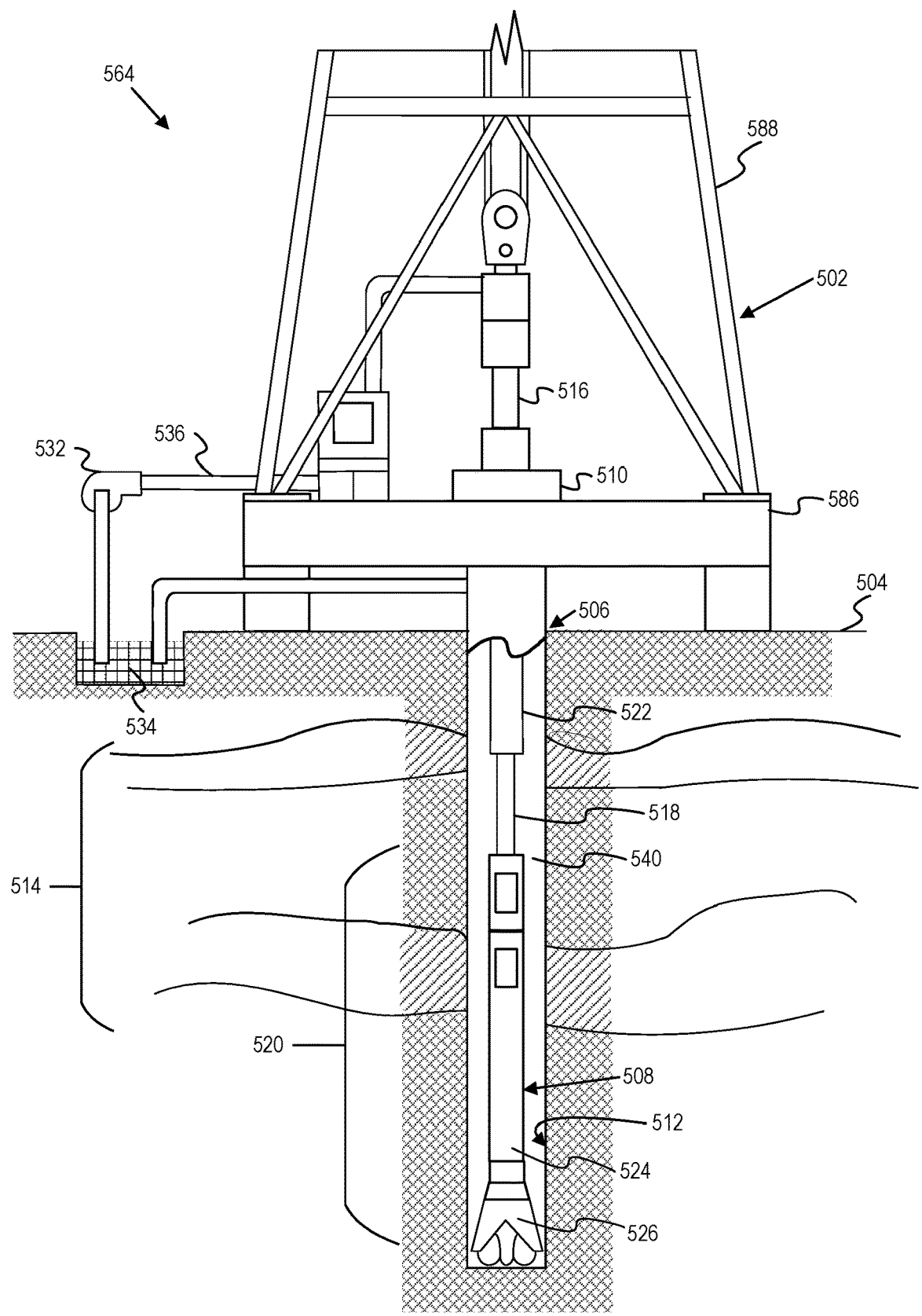
FIG. 5 is a drawing of a drilling rig system.

FIG. 5 is a drawing of a drilling rig system. For example, in FIG. 5 it can be seen how a system 564 may also form a portion of a drilling rig 502 located at the surface 504 of a well 506. Drilling of oil and gas wells is commonly carried out using a string of drill pipes connected together so as to form a drilling string 508 that is lowered through a rotary table 510 into a wellbore or borehole 512. Here a drilling platform 586 is equipped with a derrick 588 that supports a hoist.

The drilling rig 502 may thus provide support for the drill string 508. The drill string 508 may operate to penetrate the rotary table 510 for drilling the borehole 512 through subsurface formations 514. The drill string 508 may include a Kelly 516, drill pipe 518, and a bottom hole assembly 520, perhaps located at the lower portion of the drill pipe 518.

The bottom hole assembly 520 may include drill collars 522, a down hole tool 524, and a drill bit 526. The drill bit 526 may operate to create a borehole 512 by penetrating the surface 504 and subsurface formations 514. The down hole tool 524 may include any of a number of different types of tools including MWD tools, LWD tools, and others.

During drilling operations, the drill string 508 (perhaps including the Kelly 516, the drill pipe 518, and the bottom hole assembly 520) may be rotated by the rotary table 510. In addition to, or alternatively, the bottom hole assembly 520 may also be rotated by a motor (e.g., a mud motor) that is located down hole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 514.

During drilling operations, a mud pump 532 may pump drilling mud from a mud pit 534 through a hose 536 into the drill pipe 518 and down to the drill bit 526. The drilling mud can flow out from the drill bit 526 and be returned to the surface 504 through an annular area 540 between the drill pipe 518 and the sides of the borehole 512. The drilling mud may then be returned to the mud pit 534, where such fluid is filtered. In some embodiments, the drilling mud can be used to cool the drill bit 526, as well as to provide lubrication for the drill bit 526 during drilling operations. Additionally, the drilling mud may be used to remove subsurface formation 514 cuttings created by operating the drill bit 526.

Referring now to FIG. 1, a system 564 can include the imaging device housing 117 deployed such that the imaging device 119 directed at the cuttings from downhole subsurface formation 514 as they return to the surface 504. Alternatively, the imagine device housing 117 and imaging device 119 can be directed at various components of the currently embodied drilling operation for monitoring purposes.

It should also be understood that the apparatus and systems of various embodiments can be used in applications other than for pumping and drilling operations, and thus, various embodiments are not to be so limited. The illustrations of system 100 and systems 564 are intended to provide a general understanding of the structure of various embodiments, and they are not intended to serve as a complete description of all the elements and features of apparatus and systems that might make use of the structures described herein.

Example Computer

Figure 6:
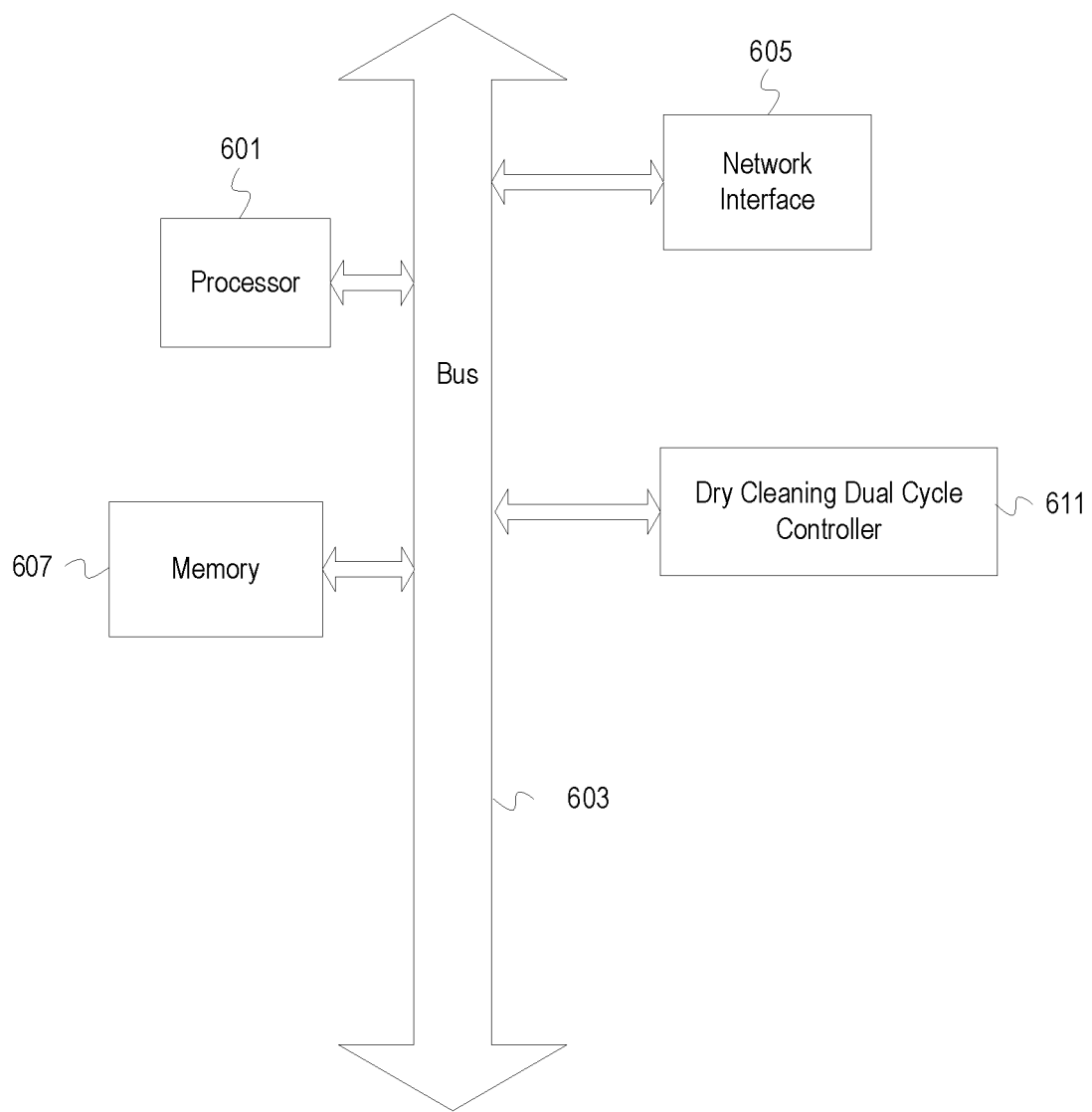
FIG. 6 is an example computer with a DCDC controller.

FIG. 6 depicts an example computer with a DCDC controller. The computer includes a processor 601 (possibly including multiple processors, multiple cores, multiple nodes, and/or implementing multi-threading, etc.). The computer includes memory 607, a bus 603, and a network interface 605 (e.g., a wireless interface, interface for a wired connection, etc.).

The computer also includes a DCDC controller 611. The DCDC controller 611 can detect obstructions to the imaging device on the view zone as described variously above. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601. While depicted as a computer, some embodiments can be any type of device or apparatus to perform operations described herein.

It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device. The memory 607 may be system memory or any one or more of the above already described possible realizations of machine-readable media.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for processing and analyzing of particles from downhole as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Embodiment 1: A method including: detecting a visual obstruction in a viewing zone of an imaging device based, at least in part, on imaging data captured by the imaging device, and based on detection of the visual obstruction, directing compressed air through a first flow path in which a base drilling fluid is injected into the compressed air to create a mist and from which the mist is distributed onto the viewing zone for a first cleaning cycle, and after directing the compressed air through the first flow path, directing compressed air through a second flow path from which the compressed air is distributed onto the viewing zone for a second cleaning cycle.

Embodiment 2: The method of Embodiment 1, further including capturing the image data while the imaging device is deployed in a hydrocarbon extraction environment.

Embodiment 3: The method of Embodiments 1-2, wherein directing the compressed air through the first flow path includes communicating a control signal to a pneumatic solenoid to set the pneumatic solenoid to the first flow path.

Embodiment 4: The method of Embodiments 1-3, wherein directing the compressed air through the second flow path includes communicating a control signal to a pneumatic solenoid to set the pneumatic solenoid to the second flow path.

Embodiment 5: The method of Embodiment 4, wherein communicating the control signal to the pneumatic solenoid is after a time interval has elapsed since directing the compressed air through the first flow path.

Embodiment 6: The method of Embodiments 1-5 further including communicating a signal to a compressor to initiate generation of compressed air based on detection of the visual obstruction and prior to directing the compressed air through the first flow path.

Embodiment 7: The method of Embodiments 1-6 further including terminating compressed air generation after a time interval elapses since directing the compressed air through the second flow path.

Embodiment 8: A non-transitory, computer-readable medium having instructions stored thereon that are executable by a computing device, the instructions to, based on detection of a visual obstruction in a viewing zone of an imaging device based, at least in part, on imaging data captured by the imaging device, direct compressed air through a first flow path in which a base drilling fluid is injected into the compressed air to create a mist and from which the mist is distributed onto the viewing zone for a first cleaning cycle, and after directing the compressed air through the first flow path, direct compressed air through a second flow path from which the compressed air is distributed onto the viewing zone for a second cleaning cycle.

Embodiment 9: The machine-readable media of Embodiment 8, further including instructions to determine whether a visual obstruction has been detected in the viewing zone of the imaging device.

Embodiment 10: The machine-readable media of Embodiments 8-9, wherein the instructions to direct the compressed air through the first flow path include instructions to communicate a control signal to a pneumatic solenoid to set the pneumatic solenoid to the first flow path.

Embodiment 11: The machine-readable media of Embodiments 8-10, wherein the instructions to direct the compressed air through the second flow path include instructions to communicate a control signal to a pneumatic solenoid to set the pneumatic solenoid to the second flow path.

Embodiment 12: The machine-readable media of Embodiment 11, wherein the instructions to communicate the control signal to the pneumatic solenoid include instructions to communicate the control signal after a time interval has elapsed since directing the compressed air through the first flow path.

Embodiment 13: A system including a compressor, a pneumatic solenoid coupled with the compressor to receive compressed air, the pneumatic solenoid including a valve that can be set to define a first flow path or a second flow path, a lubricator coupled with a first port of the pneumatic solenoid to receive compressed air via the first flow path, the lubricator including a reservoir of base drilling fluid and adapted to inject a portion of the base drilling fluid from the reservoir into compressed air from the pneumatic solenoid, a fitting coupled to a second port of the pneumatic solenoid and coupled to the lubricator, and a computing device communicatively coupled with the compressor and the pneumatic solenoid, the computing device including program code executable by the computing device to cause the computing device to, send a control signal to the compressor to initiate compressed air generation, and send a control signal to the pneumatic solenoid to set the pneumatic solenoid to the first flow path corresponding to the first port based on detection of visual obstruction on a viewing zone of an imaging device.

Embodiment 14: The system of Embodiment 13, further including a data acquisition system communicatively coupled with the computing device and the imaging device, the data acquisition system including program code executable by the data acquisition system to cause the data acquisition system to detect visual obstruction on the viewing zone of the imaging device, and notify the computing device of the detection of visual obstruction on the viewing zone of the imaging device.

Embodiment 15: The system of Embodiments 13-14, further including a set of tubes directed at the viewing zone, and a manifold coupled with the fitting and the set of tubes and communicatively coupled with the computing device, the manifold including a first internal valve configuration corresponding to the first flow path and a second internal valve configuration corresponding to the second flow path.

Embodiment 16: The system of Embodiment 15, wherein the computing device further includes program code executable by the computing device to cause the computing device to send a control signal to the manifold to assume the first internal valve configuration corresponding to the first flow path based on the detection of visual obstruction on the viewing zone of the imaging device, and send a control signal to the manifold to assume the second internal valve configuration after a time interval elapses since sending the control signal to the manifold to assume the first internal valve configuration.

Embodiment 17: The system of Embodiments 15-16, wherein a first pipe couples the fitting to the second port of the pneumatic solenoid, a second pipe couples the fitting to the lubricator, a third pipe couples the fitting to the manifold, a fourth pipe couples the lubricator to the first port of the pneumatic solenoid, and a fifth pipe couples the compressor to the pneumatic solenoid.

Embodiment 18: The system of Embodiments 13-17, further including an imaging device housing that houses the imaging device and that includes the view zone of the imaging device.

Embodiment 19: The system of Embodiments 13-18, wherein the computing device further includes program code executable by the computing device to cause the computing device to send a control signal to the pneumatic solenoid to set the pneumatic solenoid to the second flow path corresponding to the second port after a time interval elapses since the control signal to the pneumatic solenoid to set the pneumatic solenoid to the first flow path, and send a control signal to the compressor to stop compressed air generation after a time interval elapses since the control signal to the pneumatic solenoid to set the pneumatic solenoid to the second flow path.

Embodiment 20: The system of Embodiments 13-19, wherein the base drilling fluid includes a base fluid present in an ambient environment of the imaging device.

What is claimed is:

1. A method including:
   detecting a visual obstruction in a viewing zone of an imaging device based, at least in part, on imaging data captured by the imaging device; and
   based on detection of the visual obstruction,
      directing compressed air through a first flow path in which a base drilling fluid is injected into the compressed air to create a mist and from which the mist is distributed onto the viewing zone for a first cleaning cycle; and
      after directing the compressed air through the first flow path, directing compressed air through a second flow path from which the compressed air is distributed onto the viewing zone for a second cleaning cycle.

2. The method of claim 1, further including capturing the image data while the imaging device is deployed in a hydrocarbon extraction environment.

3. The method of claim 1, wherein directing the compressed air through the first flow path includes communicating a control signal to a pneumatic solenoid to set the pneumatic solenoid to the first flow path.

4. The method of claim 1, wherein directing the compressed air through the second flow path includes communicating a control signal to a pneumatic solenoid to set the pneumatic solenoid to the second flow path.

5. The method of claim 4, wherein communicating the control signal to the pneumatic solenoid is after a time interval has elapsed since directing the compressed air through the first flow path.

6. The method of claim 1 further including communicating a signal to a compressor to initiate generation of compressed air based on detection of the visual obstruction and prior to directing the compressed air through the first flow path.

7. The method of claim 1 further including terminating compressed air generation after a time interval elapses since directing the compressed air through the second flow path.

8. A non-transitory computer-readable medium having instructions stored thereon that are executable by a computing device, the instructions to:
   based on detection of a visual obstruction in a viewing zone of an imaging device based, at least in part, on imaging data captured by the imaging device, direct compressed air through a first flow path in which a base drilling fluid is injected into the compressed air to create a mist and from which the mist is distributed onto the viewing zone for a first cleaning cycle; and after directing the compressed air through the first flow path, direct compressed air through a second flow path from which the compressed air is distributed onto the viewing zone for a second cleaning cycle.

9. The non-transitory computer-readable medium of claim 8, further including instructions to determine whether a visual obstruction has been detected in the viewing zone of the imaging device.

10. The non-transitory computer-readable medium of claim 8, wherein the instructions to direct the compressed air through the first flow path include instructions to communicate a control signal to a pneumatic solenoid to set the pneumatic solenoid to the first flow path.

11. The non-transitory computer-readable medium of claim 8, wherein the instructions to direct the compressed air through the second flow path include instructions to communicate a control signal to a pneumatic solenoid to set the pneumatic solenoid to the second flow path.

12. The non-transitory computer-readable medium of claim 11, wherein the instructions to communicate the control signal to the pneumatic solenoid include instructions to communicate the control signal after a time interval has elapsed since directing the compressed air through the first flow path.

13. A system including:
a compressor;
a pneumatic solenoid coupled with the compressor to receive compressed air, the pneumatic solenoid including a valve that can be set to define a first flow path or a second flow path;
a lubricator coupled with a first port of the pneumatic solenoid to receive compressed air via the first flow path, the lubricator including a reservoir of base drilling fluid and adapted to inject a portion of the base drilling fluid from the reservoir into compressed air from the pneumatic solenoid;
a fitting coupled to a second port of the pneumatic solenoid and coupled to the lubricator; and
a computing device communicatively coupled with the compressor and the pneumatic solenoid, the computing device including program code executable by the computing device to cause the computing device to,
send a control signal to the compressor to initiate compressed air generation; and
send a control signal to the pneumatic solenoid to set the pneumatic solenoid to the first flow path corresponding to the first port based on detection of visual obstruction on a viewing zone of an imaging device.

14. The system of claim 13, further including a data acquisition system communicatively coupled with the computing device and the imaging device, the data acquisition system including program code executable by the data acquisition system to cause the data acquisition system to,
detect visual obstruction on the viewing zone of the imaging device; and
notify the computing device of the detection of visual obstruction on the viewing zone of the imaging device.

15. The system of claim 13, further including,
a set of tubes directed at the viewing zone; and
a manifold coupled with the fitting and the set of tubes and communicatively coupled with the computing device, the manifold including a first internal valve configuration corresponding to the first flow path and a second internal valve configuration corresponding to the second flow path.

16. The system of claim 15, wherein the computing device further includes program code executable by the computing device to cause the computing device to,
send a control signal to the manifold to assume the first internal valve configuration corresponding to the first flow path based on the detection of visual obstruction on the viewing zone of the imaging device; and
send a control signal to the manifold to assume the second internal valve configuration after a time interval elapses since sending the control signal to the manifold to assume the first internal valve configuration.

17. The system of claim 15, wherein a first pipe couples the fitting to the second port of the pneumatic solenoid, a second pipe couples the fitting to the lubricator, a third pipe couples the fitting to the manifold, a fourth pipe couples the lubricator to the first port of the pneumatic solenoid, and a fifth pipe couples the compressor to the pneumatic solenoid.

18. The system of claim 13, further including an imaging device housing that houses the imaging device and that includes the view zone of the imaging device.

19. The system of claim 13, wherein the computing device further includes program code executable by the computing device to cause the computing device to,
send a control signal to the pneumatic solenoid to set the pneumatic solenoid to the second flow path corresponding to the second port after a time interval elapses since the control signal to the pneumatic solenoid to set the pneumatic solenoid to the first flow path; and
send a control signal to the compressor to stop compressed air generation after a time interval elapses since the control signal to the pneumatic solenoid to set the pneumatic solenoid to the second flow path.

20. The system of claim 13, wherein the base drilling fluid includes a base fluid present in an ambient environment of the imaging device.

* * * * *